(12) United States Patent
Keller et al.

(10) Patent No.: US 12,169,021 B2
(45) Date of Patent: Dec. 17, 2024

(54) ACTUATOR, AND DEVICE FOR ENGAGING A PARK LOCK OF A MOTOR-VEHICLE AUTOMATIC TRANSMISSION HAVING SUCH AN ACTUATOR, AND MOTOR VEHICLE EQUIPPED THEREWITH

(71) Applicant: Kuster Holding GmbH, Ehringshausen (DE)

(72) Inventors: Oliver Keller, Nister-Mohrendorf (DE); Tobias Eichenauer, Lahnau (DE); Kevin Hartbrod, Lahnau (DE)

(73) Assignee: Küster Holding GmbH, Ehringshausen (DE)

( * ) Notice: Subject to any disclaimer, the term of this patent is extended or adjusted under 35 U.S.C. 154(b) by 0 days.

(21) Appl. No.: 18/247,283

(22) PCT Filed: Aug. 25, 2021

(86) PCT No.: PCT/EP2021/073454
§ 371 (c)(1),
(2) Date: Mar. 30, 2023

(87) PCT Pub. No.: WO2022/069113
PCT Pub. Date: Apr. 7, 2022

(65) Prior Publication Data
US 2024/0159312 A1 May 16, 2024

(30) Foreign Application Priority Data

Oct. 1, 2020 (DE) .......................... 102020125725.2

(51) Int. Cl.
| | | |
|---|---|---|
| *F16H 61/28* | (2006.01) | |
| *F16H 61/12* | (2010.01) | |
| *F16H 61/32* | (2006.01) | |
| *F16H 63/34* | (2006.01) | |
| *F16H 61/36* | (2006.01) | |

(52) U.S. Cl.
CPC ......... *F16H 61/2807* (2013.01); *F16H 61/12* (2013.01); *F16H 61/32* (2013.01);
(Continued)

(58) Field of Classification Search
CPC .. F16H 61/12; F16H 61/32; F16H 2061/2853; F16H 2061/2869;
(Continued)

(56) References Cited

U.S. PATENT DOCUMENTS

| | | | | |
|---|---|---|---|---|
| 4,674,344 A | * | 6/1987 | Kazino | ................. F02N 11/087 |
| | | | | 335/131 |
| 11,118,679 B2 | * | 9/2021 | Blücher | ................ F16H 63/304 |

(Continued)

FOREIGN PATENT DOCUMENTS

| | | |
|---|---|---|
| DE | 10045953 A1 | 5/2002 |
| DE | 10105637 A1 | 8/2002 |

(Continued)

*Primary Examiner* — William C Joyce
(74) *Attorney, Agent, or Firm* — Rogowski Law LLC

(57) ABSTRACT

An actuator to set a park lock of an automatic transmission of a motor vehicle has a drive (2) driving a drive shaft (1), a first actuating element (3) operatively connected to the drive shaft (1) for actuating a switching device, a spring element (5), which is supported on one side on a housing component (16) of the actuator, and on the other side on a second actuating element (17) designed to load the spring element (5). The actuator also has an electromagnetic retaining device (32) with an electromagnet (50) which interacts magnetically with a magnetic armature (52) comprising a ferromagnetic material component to retain the spring element (5) which is under loading, building up a spring return force. The magnetic armature (52) is mounted tiltably and/or pivotably on a pivot component (55) of the retaining device (32).

18 Claims, 10 Drawing Sheets

(52) U.S. Cl.
CPC ..... *F16H 63/3466* (2013.01); *F16H 63/3475* (2013.01); *F16H 2061/1232* (2013.01); *F16H 2061/1292* (2013.01); *F16H 2061/2853* (2013.01); *F16H 2061/2869* (2013.01); *F16H 2061/2892* (2013.01); *F16H 2061/326* (2013.01); *F16H 61/36* (2013.01)

(58) Field of Classification Search
CPC ........... F16H 2061/2892; F16H 63/304; F16H 63/3466; F16H 63/6475
See application file for complete search history.

(56) References Cited

U.S. PATENT DOCUMENTS

| | | |
|---|---|---|
| 2018/0238448 A1 | 8/2018 | Gausrab et al. |
| 2020/0032898 A1 | 1/2020 | Blucher et al. |

FOREIGN PATENT DOCUMENTS

| | | | | |
|---|---|---|---|---|
| DE | 102011014815 A1 | 10/2011 | | |
| DE | 102016224660 A1 | 6/2018 | | |
| DE | 102017103317 A1 | 8/2018 | | |
| DE | 102017218638 A1 | 4/2019 | | |
| EP | 3225887 A1 | 10/2017 | | |
| FR | 2822903 A1 * | 10/2002 | ............ | F02N 15/02 |
| SU | 1779577 A1 * | 12/1992 | | |
| WO | 2017182555 A1 | 10/2017 | | |
| WO | 2019076587 A1 | 4/2019 | | |

* cited by examiner

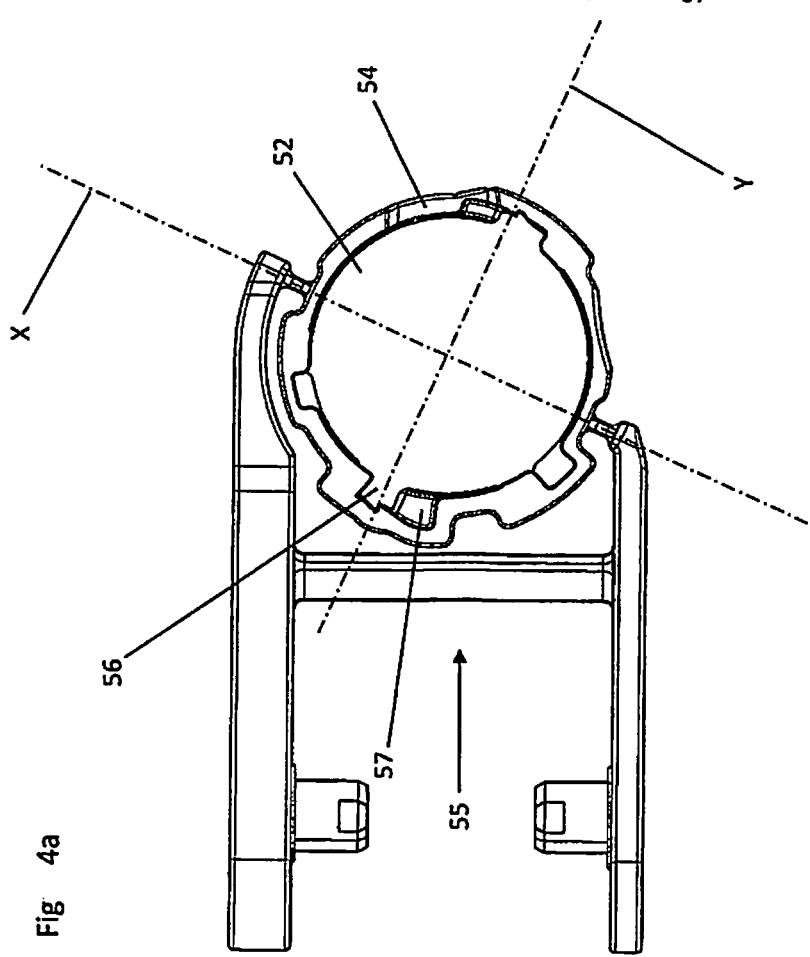

ACTUATOR, AND DEVICE FOR ENGAGING A PARK LOCK OF A MOTOR-VEHICLE AUTOMATIC TRANSMISSION HAVING SUCH AN ACTUATOR, AND MOTOR VEHICLE EQUIPPED THEREWITH

CROSS-REFERENCE TO RELATED APPLICATIONS

This application is a national stage application (under 35 USC § 371) of PCT/EP2021/073454, filed Aug. 25, 2021, which claims benefit of DE 102020125725.2, filed Oct. 1, 2020, the contents of each of which is incorporated by reference herein.

BACKGROUND OF THE INVENTION

Technical Field and State of the Art

The invention relates to an actuator for activating a park lock of a motor vehicle automatic transmission as well as to a motor vehicle equipped therewith.

The use of automatic shifting actuating means or shift-by-wire systems in motor vehicles entails a number of advantages in comparison to mechanically coupled shifting actuating means. Thus, for example, the shifting positions of the transmission can be selected flexibly and as a function of the vehicle state by means of software. Moreover, the park lock is no longer activated in that the driver manually sets the P-position, but rather, this is done automatically by the control software, for example, when the driver stops or leaves the vehicle. Since setting the P-position to activate the park lock before the driver leaves the vehicle is absolutely necessary for safety reasons, such systems and actuators have emergency mechanisms that are supposed to ensure that the P-position can be set, even in case of malfunctions of the actuator or in case of a power failure. These emergency mechanisms typically work with energy storage means such as, for example, mechanical spring elements, that ensure, for instance, the setting of a mechanical emergency position, independently of the actuator.

An actuator according to the generic part of patent claim 1 is disclosed in German patent application DE 10 2011 014 815 A1. This document describes a motor vehicle park lock actuator that has at least one spindle, whereby a rotational movement of a motor brings about a longitudinal movement for automatically shifting a gear. Here, the emergency function for setting the park lock is achieved by a spring element that is preloaded through the actuation of the non-park position of the actuator and that is mechanically held by means of a latch. A switching function for triggering the emergency mechanism in order to set the P-position should be performed by a power source that is independent of the actuator. However, a drawback of this type of actuator is that an independent power source is needed to trigger the emergency mechanism. Consequently, the P-position cannot be set if the independent power source is likewise not available, which can especially occur if the accumulator of the motor vehicle is discharged and if another power source such as, for example, a properly functioning generator, is likewise not available.

Moreover, in the case of the actuator of German patent application DE 10 2011 014 815 A1, it is necessary to leave the P-position in order to preload the spring element, as a result of which an undesired and unsafe vehicle situation arises since the P-position of the gear is left, even though the emergency mechanism is not yet available.

German patent (second publication) DE 100 45 953 B4 discloses a park lock device which is especially provided for a motor vehicle fitted with an automated controllable transmission. The park lock device has an actuating device comprising an actuating element to actuate a park lock, a spring-loaded means to activate the park lock, a controllable servomechanism to deactivate the park lock and a locking mechanism to latch the park lock in the deactivated state. The servomechanism is configured so as to be electromechanically operative and it is connected to a main actuation lever. The spring-loaded means, the servomechanism and the locking mechanism can be connected or operatively connected to the actuating element by means of the main actuation lever.

PCT international application WO 2017/182555 A1 discloses an actuator for setting a park lock of the automatic transmission of a motor vehicle. The actuator has a spring element whose function is to set the P-position of an automatic transmission in response to an actuator malfunction or a power failure. The spring element loaded under the build-up of a return force is held in its position by means of a holding-magnet apparatus. In order to ensure a proper magnetic holding force, it is necessary to have a contact surface that is as planar as possible between a magnet armature connected to the spring element and the actual magnet. Gaps or also an asymmetrical force introduction considerably reduce the magnetic holding force.

SUMMARY OF THE INVENTION

Before the backdrop of the above-mentioned disadvantages, an objective of the invention is to refine an actuator so that, in all situations, a reliable and efficient function of an emergency mechanism for setting the P-position is ensured. It is likewise an objective of the invention to put forward a device for setting a park lock of the automatic transmission of a motor vehicle by means of such an actuator as well as an improved motor vehicle. In this context, the actuator according to one embodiment of the invention has a drive that moves a drive shaft as well as a first actuating element that is operatively connected to the drive shaft and that serves to actuate a shifting mechanism. A spring element is supported on one side on a housing part of the actuator and, on the other side, on a second actuating element configured so as to load the spring element.

Here, the spring element has the function of setting the P-position in response to an actuator malfunction or a power failure.

Moreover, the actuator has an electromagnetic retaining apparatus with an electromagnet which magnetically interacts with a magnet armature containing a ferromagnetic material component for purposes of holding the spring element that is loaded under the build-up of a return force.

The electromagnetic retaining apparatus is provided in order to hold in place the spring element loaded under the build-up of a return force. In this manner, it is not necessary to load the spring element when shifting out of the P-position into the various shifting positions since this has already taken place previously.

The invention is then characterized in that the magnet armature is mounted so as to be tiltable and/or pivotable at a pivoting part of the retaining apparatus.

The spring element or the so-called fail-safe spring is held in a preloaded state by the electromagnets. A planar contact surface between the magnet armature and the actual magnet is necessary in order to ensure a proper magnetic holding force. Gaps or also an asymmetrical force introduction considerably reduce the holding force that is actually available in the system.

In order to attain a planar contact surface or magnetic-contact placement between the magnet armature and the electromagnet while also taking tolerances into account, the magnet armature is mounted so as to be tiltable and/or pivotable at a pivoting part of the retaining apparatus. This can be, for example, in the form of a gimbal mount or "semi-gimbal mount". The magnetic-contact placement, in other words, the magnetic contacting between the magnet armature and the electromagnet is markedly improved in this manner.

Owing to the inventive configuration of the actuator, the magnetic holding force required to hold the spring element in a preloaded state is effectively ensured not only due to the improved magnetic-contact placement but also in terms of the improved installation space, the amount of copper and the electric power.

According to a first advantageous embodiment of the invention, the pivoting part has a holding frame into which the magnet armature is inserted, whereby the holding frame is mounted so as to be tiltable and/or pivotable around a first tilting or pivoting axis X at the pivoting part. This translates into an efficient and cost-effective tilting and/or pivoting function around the first tilting or pivoting axis, for example, in an encapsulation of the holding frame by injection molding.

In an advantageous refinement of the invention, the pivoting or tilting capability of the holding frame is attained by the material shaping, particularly in the form of a tapered wall thickness between the pivoting part and the holding frame. When the holding frame is pivoted and/or tilted, this gives rise to shearing stresses or torsional stresses which are in a state of equilibrium with the torsional moment applied from the outside, similar to the case with a torque rod or torsion bar. The gating geometries in which the holding frame is joined to the pivoting part exhibit the requisite moment of resistance in the direction of loading, thereby taking into account the system requirements in the product specifications of the automotive manufacturer (OEM—original equipment manufacturer). In this context, the rotatory moment of resistance can be reduced to the greatest extent possible so that low forces can already cause the holding frame to turn in the gating geometries.

In another advantageous embodiment of the invention, the holding frame has retaining pockets arranged diametrically to each other into which the magnet armature can be inserted by means of diametrically arranged protuberances, whereby these protuberances rest on projections of the holding frame that protrude relative to the surface of the holding frame so that said protuberances can be tilted or pivoted around a second tilting or pivoting axis Y.

These projections of the holding frame can be configured so as to be at least partially spherical or ball-shaped so that the protuberances of the magnet armature rest in such a way that they can be tilted and/or pivoted around the second tilting or pivoting axis Y. The second tilting or pivoting axis of the magnet armature that is perpendicular to the gating points is attained on substantially ball-shaped or spherical contact surfaces inside the holding frame.

The magnet armature can be placed into the frame and secured in the setpoint position by means of a rotary movement in conjunction with a clip contour. After its installation in the magnet direction, it rests on the spherical or ball-shaped contact surfaces. The magnet armature can turn around by a defined extent on the ball-shaped contact surfaces, so that, in spite of the tolerances, a planar contact with the magnet as well as the maximum magnetic pull are ensured.

The magnet armature can be clipped on in the final position and it is arranged so that it can nevertheless be moved. Moreover, the magnet armature is secured against falling out of the retaining pockets. Therefore, according to this embodiment, the magnet armature is mounted so as to be tiltable or pivotable around two tilting or pivoting axes. Strictly speaking, this is a type of semi-gimbal mount.

In an advantageous variant, by means of the protuberances in the form of a bayonet catch and through a rotational movement relative to the retaining pockets, the magnet armature can be held in the holding frame so that the magnet armature is securely kept in a simple manner.

According to another embodiment of the invention, the tilting or pivoting capability of the magnet armature is effectuated around two tilting or pivoting axes X, Y that are preferably perpendicular to each other in a plane, so that, with the magnetic-contact placement, the magnet armature comes to rest with its surface substantially planarly on the stop face of the holding magnet. In the case of the above-mentioned "semi-gimbal mount", the magnet armature is mounted parallel to the magnetic-contact placement so that it can rotate around two axes that are preferably positioned substantially perpendicular to each other, or else it exhibits at least a targeted flexibility around the one axis so that a planar contact of the magnet armature on the electromagnet is ensured.

It is likewise conceivable that the pivoting part with the magnet armature can be moved back and forth between a first position formed by the magnetic-contact placement of the electromagnet and the magnet armature in order to hold the spring element, and a second position in which the spring element is not under load. In this manner, the use of the actuator according to the invention ensures that the spring element can always be preloaded before the P-position of the automatic transmission of the motor vehicle is left.

According to another advantageous variant of the invention, with the magnetic-contact placement, a planar surface of the magnet armature is oriented substantially plane-parallel to a stop face of the holding magnet, or else it rests planarly on the stop face so that, in spite of tolerances, the maximum magnetic pull is ensured.

In a refinement of the invention, the pivoting part is mechanically operatively connected to the spring element via the second actuating element, so that, with the magnetic-contact placement on the holding magnet, the pivoting part keeps the spring element loaded under the build-up of a return force.

For purposes of attaining a particularly planar magnetic-contact placement, the magnet armature can be configured so as to be substantially disk-shaped.

The holding frame and/or the pivoting part can be made of plastic.

According to another advantageous embodiment of the invention, a rotating element that can be driven and rotated by means of the drive shaft is provided which, on one side, is configured with a first control cam that is operatively connected to the first actuating element in order to actuate the shifting mechanism and, on the other side, with a second control cam in order to load the spring element.

For this purpose, the spring element can also be operatively connected to the first actuating element by means of the second actuating element, so that, due to the return force brought about by the preloading of the spring element, the first actuating element can be moved along the first control cam back into the P-position. In particular, the second actuating element can be configured as a driver for the first actuating element.

For purposes of leaving the P-position and setting the various shifting positions, for instance, R, N, D, the rotating element can be turned by means of the drive and the drive shaft in such a way that the first control cam can move the first actuating element due to the operative contact with the first control cam. A shifting mechanism that connects the actuator and the automatic transmission is configured to relay the movement generated on the actuator to the automatic transmission so that it is possible to leave the P-position and set other shifting positions, for example, R, N, D.

For this purpose, the first control cam can have different pitches for the shifting movement or for setting the shifting positions. The actuating force consists substantially of the minimum adjusting force required to set the various shifting positions in the transmission and, if applicable, of the return force of the spring element against which the actuator works already upon leaving the P-position. For instance, such an actuating force can amount to about 500 N. In case of an emergency operation, as a countermove, the rotating element and the motor are turned back due to the pitch of the first control cam acting together with the first and second actuating elements of the actuator under the effect of the spring force applied by the spring element.

In this context, in order for the first control cam to be attacked or engaged, a first engaging element of the actuating element is provided to actuate a shifting mechanism, while a second engaging element of the second actuating element is provided in order to attack or engage the second control cam.

In order to attain a rotating element whose construction is particularly simple, it has proven to be advantageous for the rotating element to be configured as a circular disk on which the two control cams are each arranged on opposite surfaces of the circular disk. In this manner, the control cams can be easily arranged with the appertaining engaging elements without it becoming necessary to take into consideration disturbing influences of the other control cam or of the engaging element corresponding thereto.

Should the spring element once not be preloaded when the P-position is being left, the first control cam is configured in such a way that, when the rotating element is turned from its angular position of 0° to its maximum positive angular position of up to +1 8 0°, the spring element is loaded under the build-up of a return force. In this process, the spring element is preloaded especially directly after the P-position has been left, so that the return force of the spring element that is immediately available is sufficient to guide the first actuating element once again back into the P-position.

In this operating case, it can be provided that the first actuating element works as a driver for the second actuating element so that, under the effect of the build-up of the return force, the spring element is guided into its loaded position by the second actuating element that is carried along under the effect of the first actuating element.

In this context, it has also been proven advantageous for a worm to be arranged on the drive shaft by means of which a toothed wheel array can be driven which, in turn, drives the rotating element. Here, the rotating element itself can be part of this toothed wheel array, whereby it also possible for the toothed wheel array to likewise consist of only one toothed wheel.

As an alternative, it is naturally likewise conceivable for the toothed wheel array to consist of several toothed wheels which operatively intermesh, whereby then one toothed wheel is configured as a circular disk that has the appertaining control cams on its opposite surfaces.

Of course, a claim for protection is also being made for a device for setting a park lock of a motor vehicle automatic transmission having such an actuator of the type described above.

In this context, the device according to the invention for setting a park lock in the automatic transmission of a motor vehicle has such an actuator according to the invention.

The use of an actuator according to the invention in a device for setting a park lock in the automatic transmission of a motor vehicle now ensures that the spring element can always be preloaded before the P-position of the automatic transmission of the motor vehicle is left. By means of the second control cam and of the second engaging element of the second actuating element, it is now namely possible to preload the spring element without changing the position of the first actuating element. As a result, when such an actuator is used in a motor vehicle having an automatic transmission, the spring element can be preloaded while the first actuating element is in such a position that the automatic transmission of the motor vehicle is set in the P-position.

In order for this preloading to be maintained when the rotating element is turned back out of its maximum angular position, for example, from −180° all the way to 0°, an electromagnetic retaining apparatus is advantageously provided with which the spring element that is loaded under the build-up of a return force is held in its position. In this manner, it is not necessary to load the spring element when shifting out of the P-position into the various shifting positions since this has already taken place previously.

Moreover, protection is naturally also being claimed for a motor vehicle having such a device, whereby the motor vehicle has an automatic transmission and a device as described above for setting a park lock of an automatic transmission.

Additional objectives, advantages, features and application possibilities of the present invention can be gleaned from the description below of embodiments making reference to the drawings. In this context, all of the described and/or depicted features, either on their own or in any meaningful combination, constitute the subject matter of the present invention, also irrespective of their compilation in the claims or in the claims to which they refer.

DESCRIPTION OF THE DRAWINGS

In this context, the following is shown, at times schematically.

DETAILED DESCRIPTION

Figure 1:
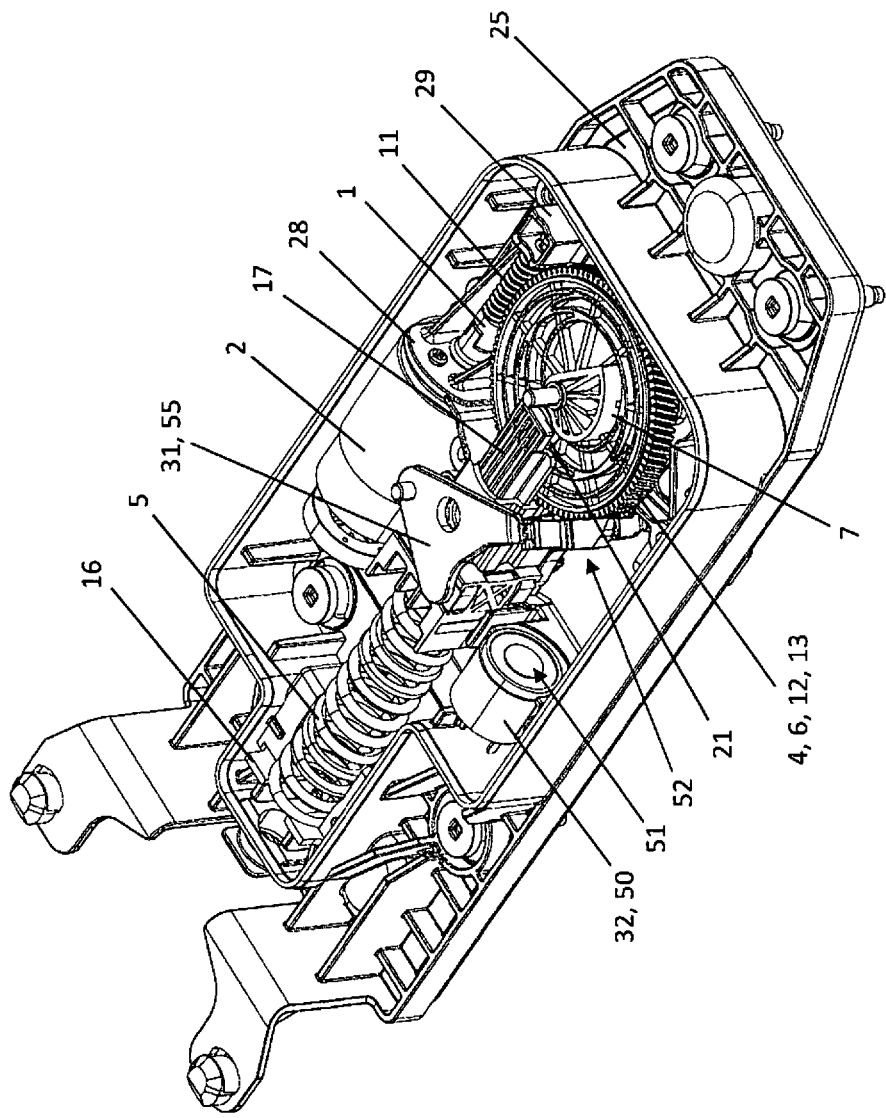
FIG. 1 an embodiment of an actuator according to the invention arranged in a housing, in a first position, FIG. 2 the actuator as shown in FIG. 1, in a second position, FIG. 3 the actuator as shown in FIG. 1, in a third position, FIG. 4 a detailed view of the actuator as shown in FIG. 1, with a pivoting part having a holding frame for a magnet armature, in two positions, FIG. 5 a detailed view as shown in FIG. 4, in two positions, FIG. 6 the actuator as shown in FIGS. 1 to 3, in a perspective plan view from above, FIG. 7 the actuator as shown in FIG. 6, in a perspective plan view from below, FIG. 8 the actuator as shown in FIG. 7, in another perspective plan view from below, FIG. 9 the actuator as shown in FIG. 8, in a view from below, and FIG. 10 the actuator as shown in one of the preceding figures, in a view from above.

For the sake of greater clarity, identical components or those having the same effect are provided with the same reference numerals in the figures of the drawing presented below, making reference to an embodiment.

Figure 2:
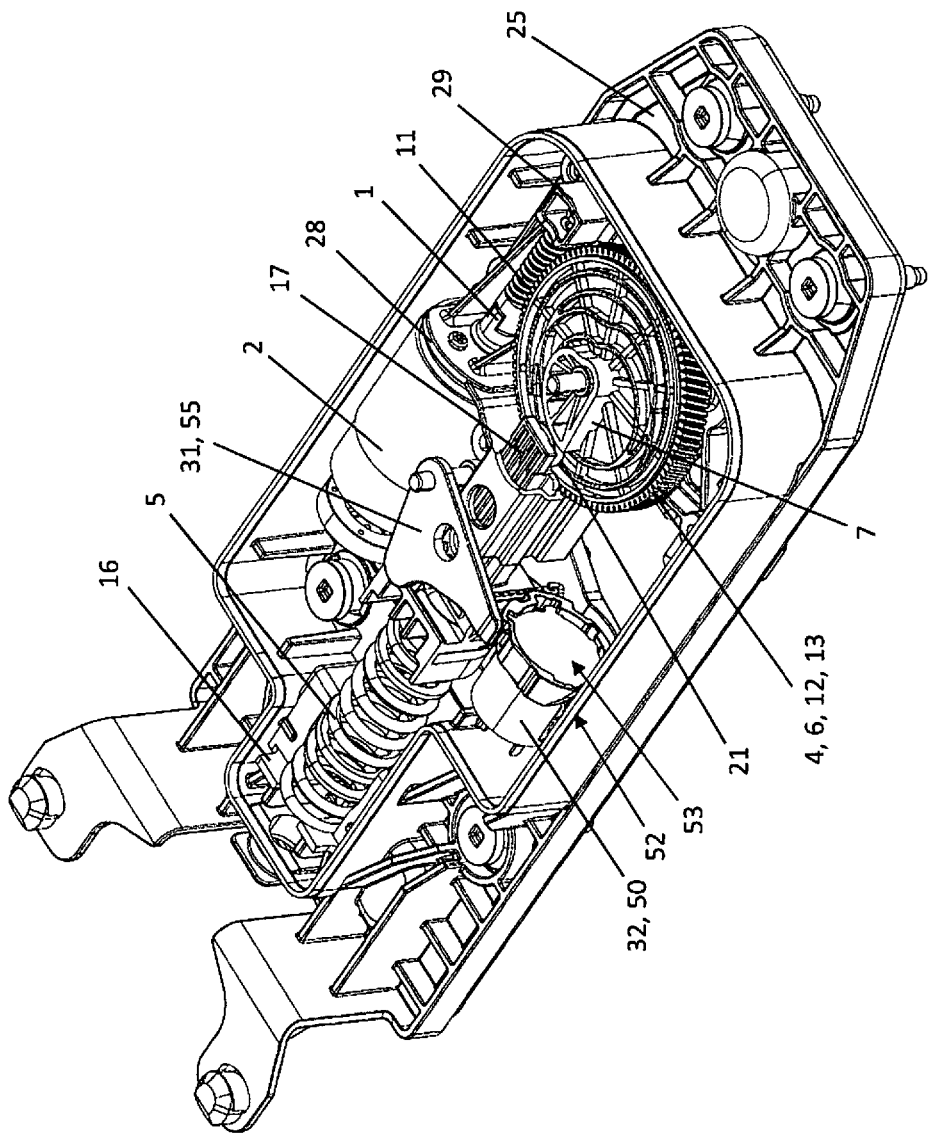
Figure 3:
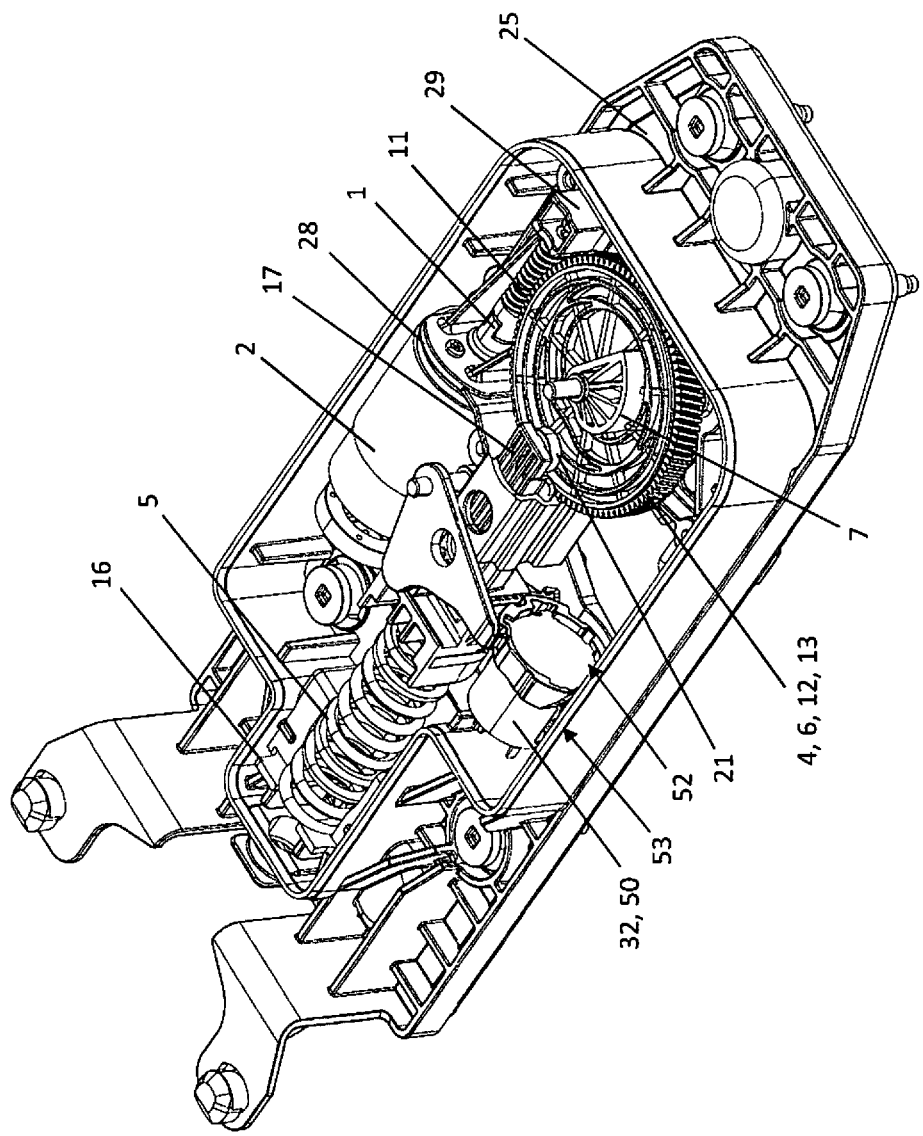

FIGS. 1 to 3 show an embodiment of an actuator according to the invention that is arranged in a housing having a housing lid and a housing plate 25. The actuator here is arranged on the housing plate 25 and is covered with the housing lid. FIGS. 6 to 10 also show a cable control 14 by means of which various shifting positions of an automatic transmission of a motor vehicle can be set. In this context, the cable control is operatively connected to a first actuating element 3 to actuate the shifting mechanism of the automatic transmission of the motor vehicle.

FIGS. 1 to 3 then show an embodiment of the actuator according to the invention. Here, it can be clearly seen that the rotating element 4 is configured as a toothed wheel 13 and it is furthermore configured in this context as a circular disk 6. The rotating element 4 here is mounted so as to rotate at its center point and it has two different control cams 7 and 8 at its opposite surfaces 18, 19. In the present case, the toothed wheel 13, which can also be part of a toothed wheel array 12, intermeshes with a worm 11 (not visible in FIG. 2) of a drive shaft 1 of a drive 2.

Figure 9:
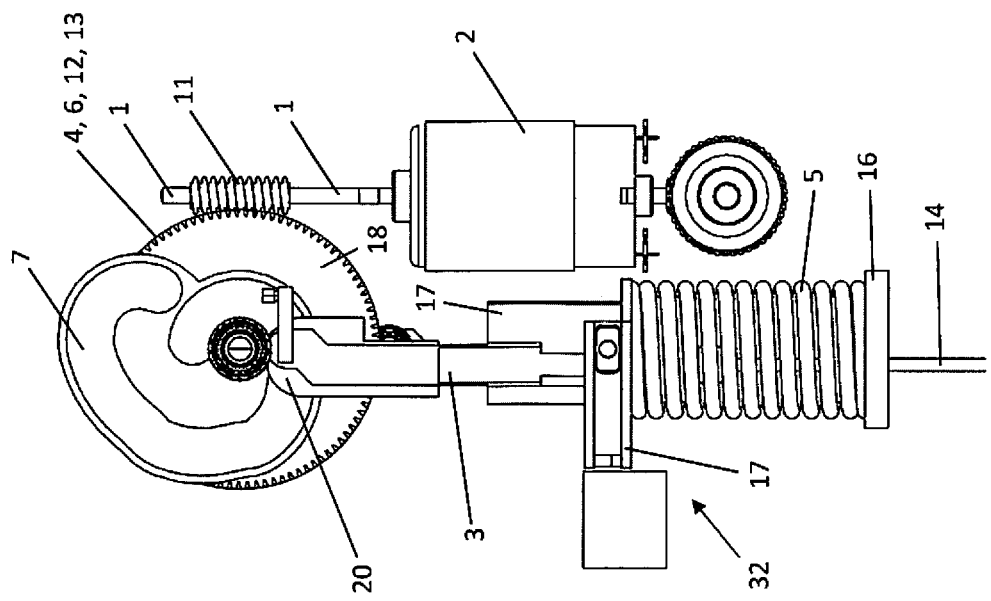

FIG. 9 also depicts the first actuating element 3 which, on one side, is provided with a first engaging element 20 that, for the engagement, engages with the first control cam 7, and which, on the other side, is connected to the cable control 14 of a shifting mechanism of the automatic transmission of the motor vehicle.

Figure 8:
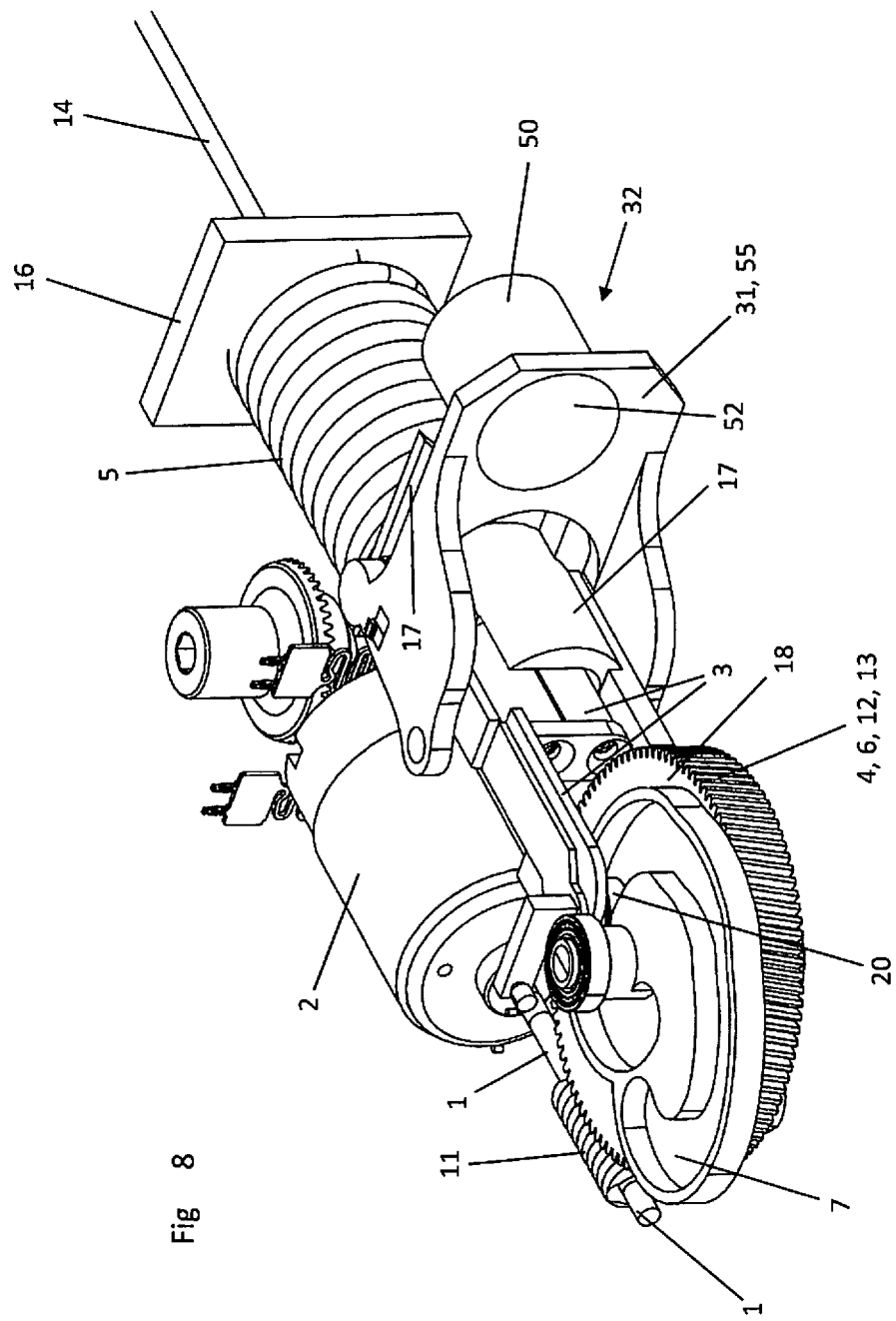

Moreover, FIGS. 8 and 9 show that the first actuating element 3 here is mounted so that it can be moved in a second actuating element 17 which, on one side, is provided with a second engaging element 21 to engage with the second control cam 8 and, on the other side, is supported on a spring element 5. Inside this second actuating element 17, for purposes of loading the spring element 5, there is also a hole in which a pin of the first actuating element 3 is mounted in such a way that it can be moved. The pin here is inserted into the hole on the side of the second actuating element 17 facing the rotating element 4 and it can be moved in there. The actuating element slides at the same time in a hole of the second actuating element 17 which is arranged parallel thereto and via which the first actuating element 3 is connected to the cable control 14. The pin and the hole interact in such a way that the end of the pin facing away from the rotating element 4 can be placed at the bottom of the hole. In this case, forces stemming from the first actuating element 3 can be transferred to the second actuating element 17 or from the second actuating element 17 to the first actuating element 3.

As long as the spring element 5 remains in the loaded position shown in FIG. 2 brought about by the second actuating element 17, the first actuating element 3 can be adjusted relative to the second actuating element 17 in the direction of the hole or in the direction of the hole arranged parallel thereto as well as in the direction of the cable control 14, so that different shifting positions of the automatic transmission can be set. As soon as the end of the pin facing away from the rotating element 4 is placed at the bottom of the hole, the first actuating element 3 and the second actuating element 17 interact as a driver vis-à-vis each other, depending on which direction the force transferred via the bottom of the hole and the pin sitting thereon is acting.

Moreover, FIGS. 1 to 3 also show the housing plate 25 on which the actuator is arranged. Likewise depicted in FIGS. 2 and 6 to 10 is that the spring element 5 is supported on one side on a housing part 16 of the actuator and, on the other side, on the actuating element 17.

Figure 6:
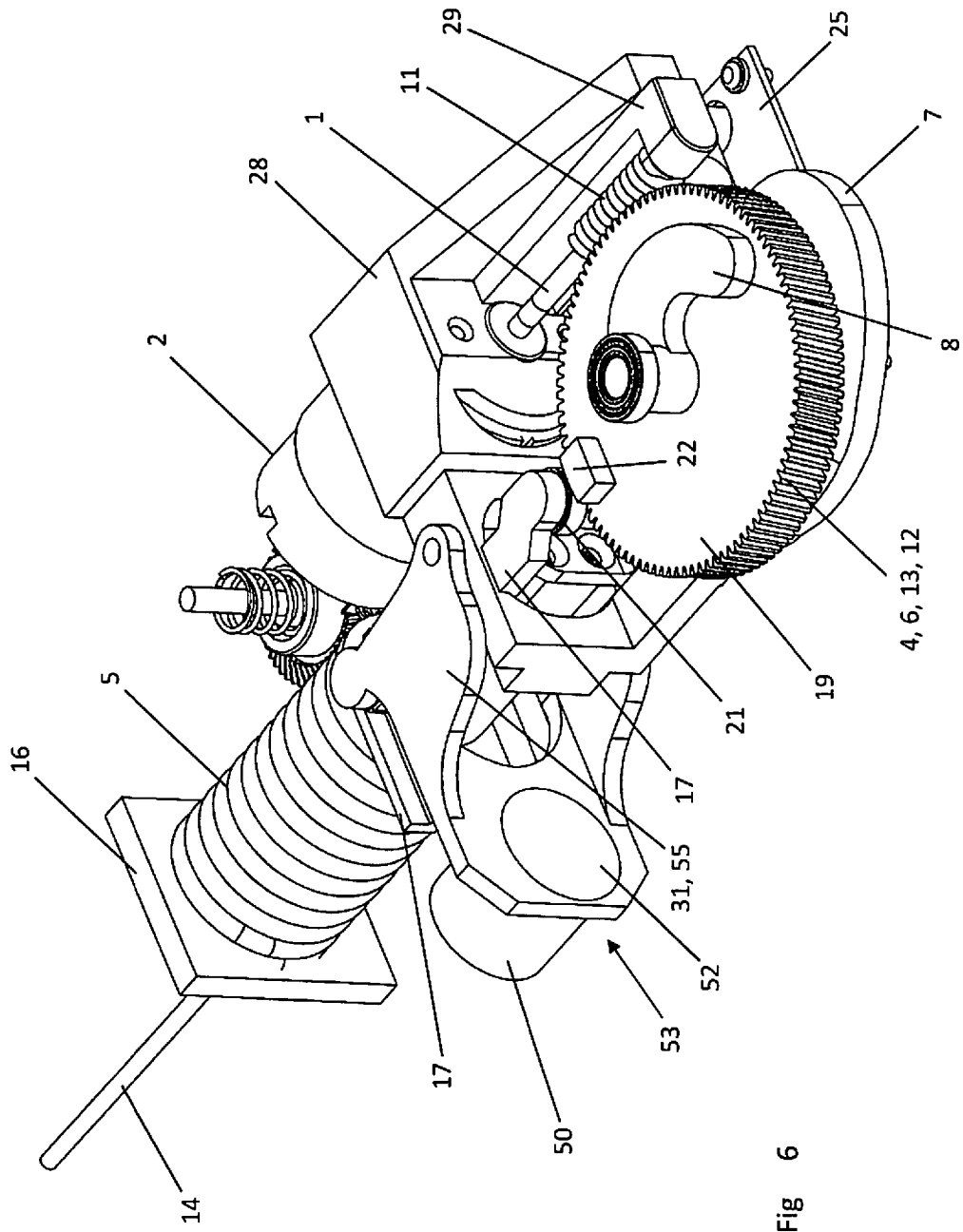

FIG. 6 as well as FIGS. 1 to 3 then show a perspective view from above of the actuator. Particularly visible in this context is the rotating element 4 configured as a circular disk 6 and toothed wheel 13. Likewise depicted there is the drive 2 with its drive shaft 1, whereby the worm 11 that intermeshes with the toothed wheel 13 is arranged on the drive shaft 1. Likewise displayed in this context is another housing part 28 that is arranged on the housing plate 23 and that has a free end 29 in which the drive shaft 1 of the drive 2 is mounted or held so as to be able to pivot.

In this context, arranged on the surface 19 of the rotating element 4 is, for one thing, the second control cam 8 which, when the rotating element 4 is turned in the direction of its maximum negative rotational position, in other words, counterclockwise in the depiction here, can be brought to engage with the second engaging element 21 of the second actuating element 17 in order to load the spring element 5. In order to achieve this, the convex-shaped section of the control cam comes into contact with the engaging element 21 which, in comparison to the depiction in FIG. 3, would be shifted in the direction of the hub of the rotating element 4 when the spring element 5 is not under load.

Figure 10:
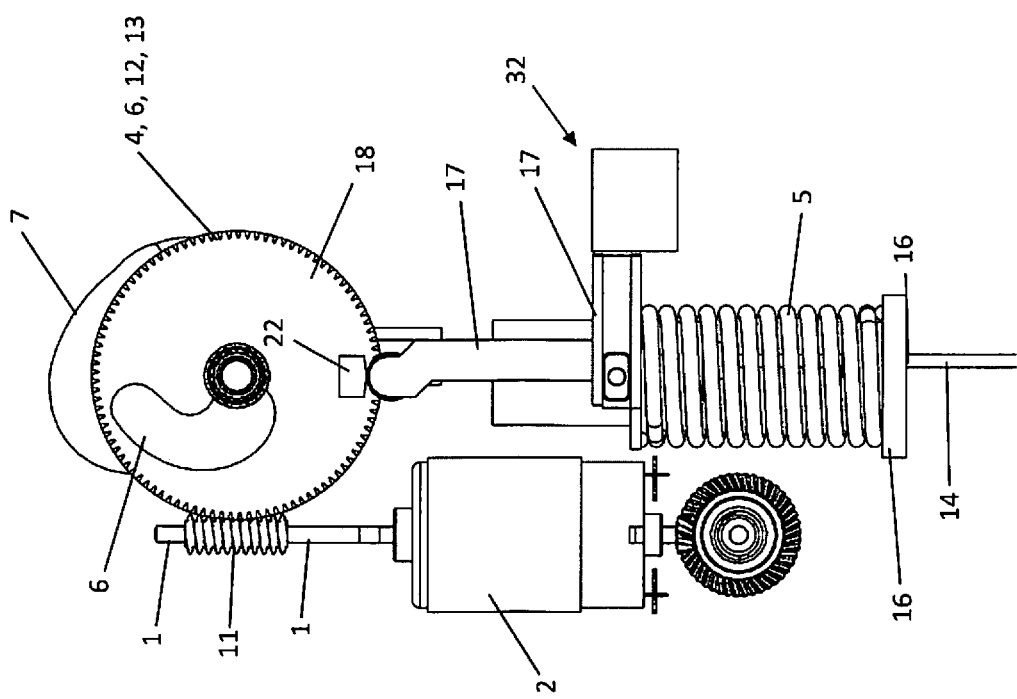

As shown further in FIGS. 6 and 10, a projection 22 is arranged the surface 19, whereby the second engaging element 21 rests on said projection when the spring element is under load. During operation of a motor vehicle, the spring element 5, once it has been preloaded, is kept in the preloaded state by means of an electromagnetic retaining apparatus 32 according to the invention. In the depiction shown in FIGS. 1 to 3, the actuating element 3, which is concealed here, is held in the P-position of the automatic transmission, corresponding to a neutral angular position of 0° of the rotating element. As long as the actuator is without power, the preloading of the spring element 5 is nevertheless maintained owing to the placement of the engaging element 21 on the projection 22, even though the electromagnetic retaining apparatus 32 is no longer exerting any holding force.

As is further shown in FIGS. 1 to 3 and 6 to 10, the electromagnetic retaining apparatus 32 has an electromagnet 50 which magnetically interacts with a magnet armature 52 containing a ferromagnetic material component in order to hold the spring element 5 that is loaded under the build-up of a return force.

According to the invention, the magnet armature 52 is mounted so as to be tiltable and/or pivotable at a pivoting part 55 of the retaining apparatus 32 which can be part of a housing part 31. For this purpose, the pivoting part 55 has a holding frame 54 in which the magnet armature 52 is inserted. The holding frame 54 can be tilted and/or pivoted around a first tilting or pivoting axis X at the pivoting part 55, as can especially be seen in FIGS. 1 to 3 and 4a, 4b as well as 5a, 5b. The pivoting part 55 is mechanically operatively connected to the spring element 5 via the second actuating element 17, so that, with the magnetic-contact placement 53 on the electromagnet 50, the pivoting part 55 keeps the spring element 5 loaded under the build-up of a return force. The term magnetic-contact placement 53 refers to a placement of the magnet armature 52 on the electromagnet 50 by virtue of the magnetic holding force.

In the present embodiment, the pivoting or tilting capability of the holding frame 54 is attained by a material shaping, particularly in the form of a tapered wall thickness between the pivoting part 55 and the holding frame 54. During pivoting and/or tilting of the holding frame, this gives rise to shearing stresses or torsional stresses which are in a state of equilibrium with the torsional moment applied from the outside, similar to the case with a torque rod or torsion bar. In this context, the rotary moment of resistance can be reduced to the greatest extent possible so that low forces can already cause the holding frame to turn the holding frame 54 in the gating geometries.

As is also shown in FIGS. 4 and 5, the magnet armature 52 can be inserted by means of diametrically arranged protuberances or projections 56 into retaining pockets 57 which are arranged diametrically to each other and which are part of the holding frame 54. These protuberances 56 can likewise be tilted or pivoted around a second tilting or pivoting axis Y as they rest on projections 59 of the holding frame 54 that protrude relative to the surface of the holding frame 54.

In the present embodiment as shown in FIGS. 4a and 4b, the projections 59 of the holding frame 54 are configured so as to be at least partially spherical or ball-shaped, so that the protuberances 56 of the magnet armature 52 rest in way that they can be tilted or pivoted around the second tilting or pivoting axis Y.

In other words, the second tilting or pivoting axis of the magnet armature 52 that is perpendicular to the gating points is attained on substantially ball-shaped or spherical contact surfaces 59 inside the holding frame 54.

The magnet armature 52 as shown in FIG. 4a is placed into the holding frame and secured in the setpoint position by means of a rotary movement in conjunction with a clip contour. As shown in FIG. 4b, after its installation in the magnet direction, the magnet armature 52 rests on the spherical or ball-shaped contact surfaces 59. The magnet armature 52 can turn around by a defined extent on the ball-shaped contact surfaces 59, so that, in spite of tolerances, a planar contact with the electromagnet 50 and thus the maximum magnetic pull are ensured.

In order to then securely hold the magnet armature 52 on the holding element 54, the magnet armature 52 can be secured in the holding frame 54, as shown further in FIGS. 4a and 4b, by means of the protuberances 52 in the form of a bayonet catch and through a rotational movement relative to the retaining pockets 57.

The tilting or pivoting capability of the magnet armature 52 serves to ensure the largest possible magnetic-contact placement 53 between the magnet armature 52 and the electromagnet, so as to consequently realize a maximum magnetic holding force. For this reason, the tilting or pivoting capability of the magnet armature 52 is effectuated around two tilting or pivoting axes X, Y that are here approximately perpendicular to each other in a plane, so that, with the magnetic-contact placement 53, the magnet armature 52 comes to rest with its surface 58 substantially planarly on the stop face 51 of the holding magnet 50. In other words, with the magnetic-contact placement 53, a planar surface 58 of the magnet armature 52 rests substantially planarly on a stop face 51 of the electromagnet 50.

Figures 5A, 5B:
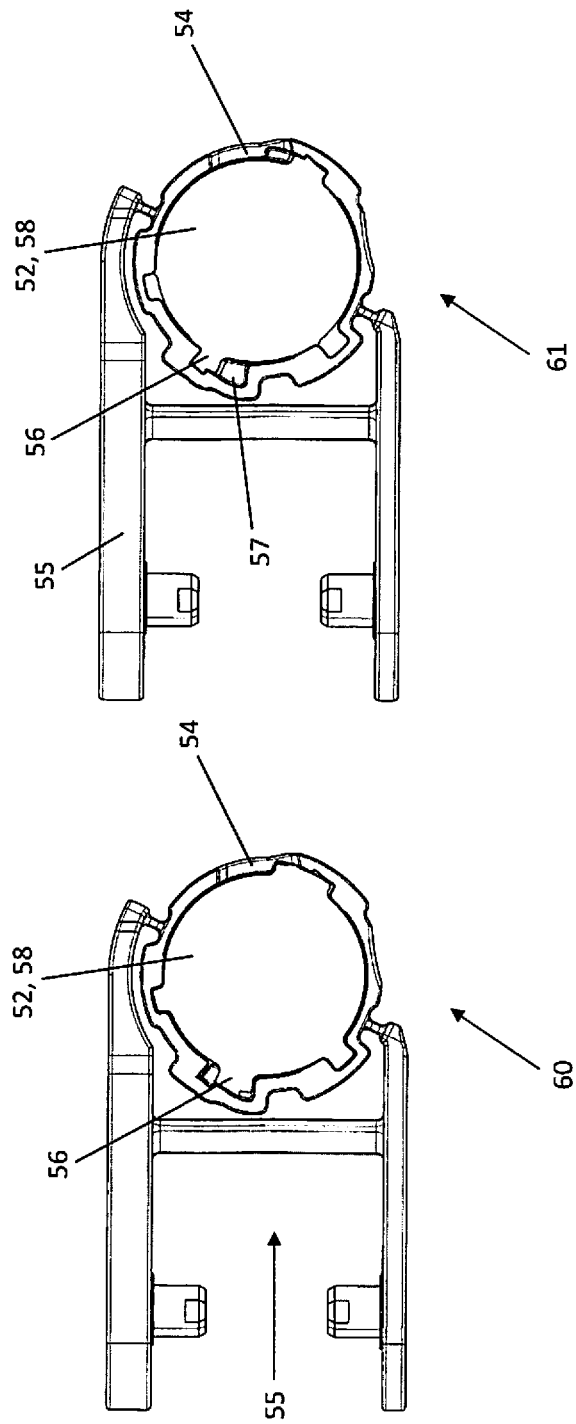

As can be further seen in FIG. 5a, the pivoting part 55 with the magnet armature 52 can be moved back and forth between a first position 60 formed by the magnetic-contact placement 53 of the electromagnet 50 and the magnet armature 52 in order to hold the spring element 5, and—as shown in FIG. 5b—a second position 61 in which the spring element 5 is not under load.

The magnet armature 52 presented here can be configured so as to be substantially disk-shaped and the holding frame 54 and/or the pivoting part 55 can be made of plastic.

Figure 7:
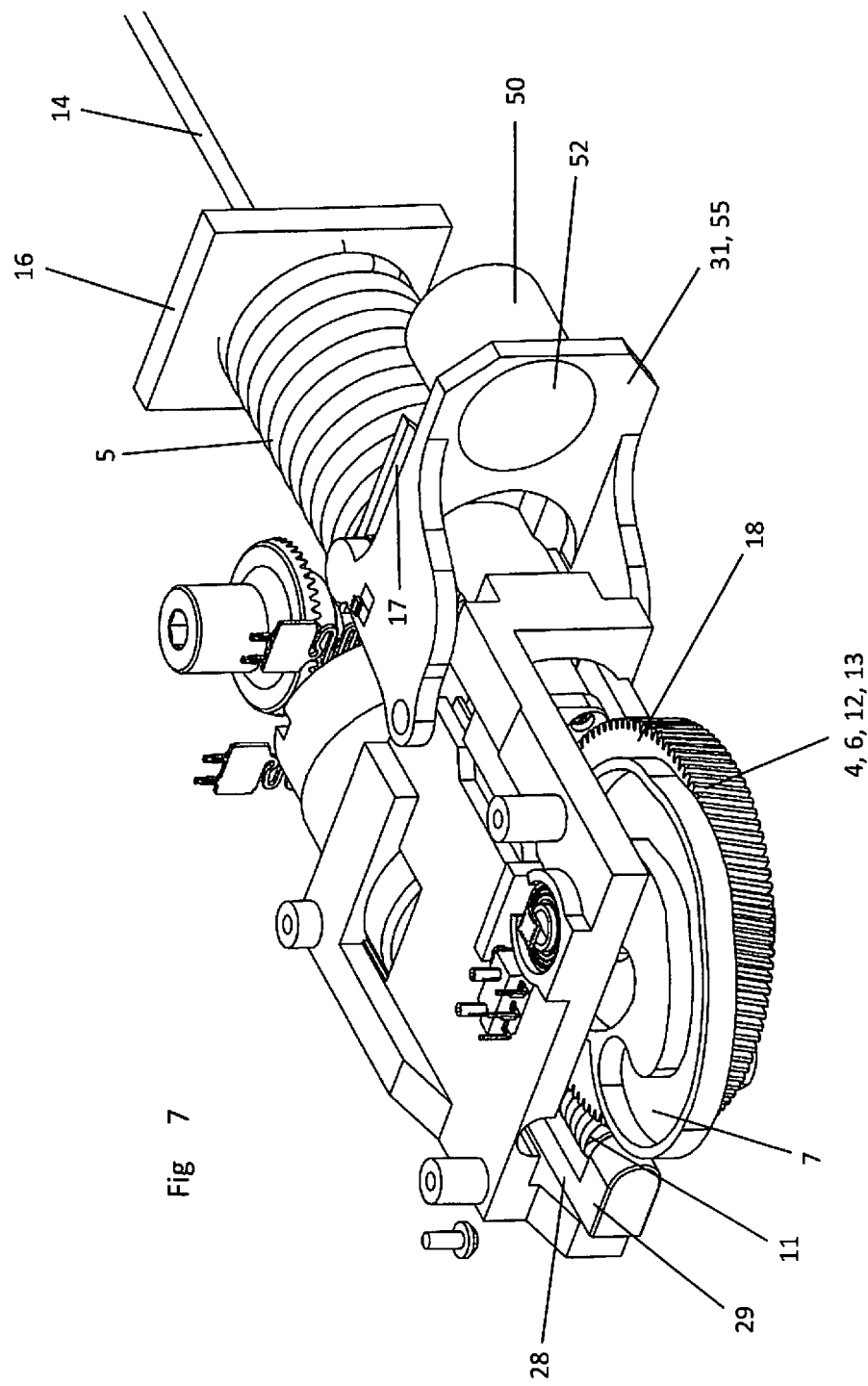

FIG. 7 then shows the actuator in a perspective view from below. Particularly noticeable here is the first control cam 7 that is arranged on the surface 18 of the rotation element 4 located opposite from the surface 19. Likewise visible here is the worm 11 of the drive shaft 1 that intermeshes with the toothed wheel 13. In this context, the drive shaft 1, in turn, is pivotably mounted in the end 29 of the housing part 28, whereby this housing part 28 is arranged on the housing plate 25.

FIG. 8 shows a depiction of FIG. 7 without the housing plate 25.

FIG. 8 then also shows the first actuating element 3 which is connected on one side to the cable control 14 that serves to actuate a shifting mechanism of an automatic transmission and, on the other side, is provided with an engaging element 20 to effectuate an operatively connecting engagement with the control cam 7. It can also be clearly seen in this view that the first actuating element 3 is mounted so that it can be moved in the second actuating element 17 with which the spring element 5 is loaded. This configuration becomes even clearer in the view shown in FIG. 9 in which an additional housing part 31 was dispensed with, in which the electromagnetic retaining apparatus 32 is held.

FIGS. 9 and 10 especially serve to illustrate the mode of functioning of the actuator according to the invention. In this context, the actuator in these depictions is in a position corresponding to the P-position of an automatic transmission of a motor vehicle and to the neutral angular position of 0° of the rotating element 4. The engaging element 20 of the first actuating element 3 is operationally connected and engaged with the first control cam 7 that is arranged on the surface 18 of the rotating element 4. If the rotating element 4 that is configured as a toothed wheel 13 is turned by the drive 2, by the drive shaft 1 and by the worm 11 counterclockwise—in this depiction—that is to say, in the direction of the maximum positive rotational position, then, due to the engagement of the engaging element 20 with the control cam 7, the actuating element 3 is moved in the direction of the housing part 16, so that, by means of the shifting mechanism (not shown here) of the automatic transmission that is actuated by the cable control 14, said actuating element 3 is moved out of its P-position and various shifting positions such as, for instance, R, N, D can be set.

In this process, owing to the control cam 7, the rotating element 4 is limited in terms of its rotational movement, so that turning is possible by about +180° or by a different value. During the turning of the rotating element 4, the preloading of the spring element 5 is maintained in this state by means of the electromagnetic retaining apparatus 32. During the movement of the first actuating element 3 in the direction of the housing part 16, its pin slides inside the hole in the direction of the bottom of the hole.

If damage occurs during operation of the motor vehicle, thus causing the actuator to be without power, then the electromagnetic retaining apparatus 32 is likewise no longer capable of maintaining the preloading of the spring element 5 due to the absence of power. Under the effect of the return force of the spring element 5, the second actuating element 17 then moves in the direction of the rotating element 4, so that the pin that in this process comes into contact with the bottom of the hole transmits the return force of the spring element 5 also to the first actuating element 3 and takes the latter along with it.

Consequently, due to the return force of the spring element 5, the engaging element 20 of the first actuating element 3 is moved back along the control cam 7 and, in this process, the rotating element is moved—in this depiction clockwise—from the maximum angular position of +180° of the rotating element 4 to the original, neutral angular position of 0° until the automatic transmission has once again taken its P-position corresponding to the angular position of the rotating element 4. This ensures that the automatic transmission always allows the P-position to be automatically set under build-up of the return force of the spring element 5, even in case of damage, especially if the motor vehicle or the actuator is without power.

In the embodiment described above, it is possible to operate the drive 2 in the direction opposite to the return movement, so that the rotating element 4 in FIG. 9 turns counterclockwise in the direction of the maximum positive rotational position. In this manner, it can be achieved that, by means of the engaging element 20, the control cam 7 pushes the actuating element 3 back in the direction of the loaded position of the spring element 5, in other words, in the direction of the housing part 16. In this context, the engagement of the pin at the bottom of the hole inside the second actuating element 17 causes the return movement of the first actuating element 3 to be transferred to the second actuating element 17, so that the second actuating element 17 engages with the spring element 5 and the latter is set back into the loaded position under the build-up of the return force.

On the basis of the depiction shown in FIG. 9, it is of course also possible for the rotating element 4 to be turned clockwise from its neutral 0° angular position into a maximum negative angular position of up to −180°. Here, no actuation of the first actuating element 3 takes place since the control cam 7 is configured in such a way that the engaging element 20 of the first actuating element 3 does not change its position. In the case of such a turning, however, as is shown in FIG. 10, the control cam 8 that is arranged on the other surface 19 of the rotating element 4 that is configured as a circular disk 6 is made to engage with the second engaging element 21 of the second actuating element 17 in order to load the spring element 5.

Once the spring element 5 has been correspondingly loaded, the rotating element 4 is now once again turned in the other direction to the neutral rotational position until the engaging element 21 of the actuating element 17 comes to rest on the projection 22, whereby the rotating element 4 in this process once again assumes its 0° angular position. During this turning procedure, the preloading of the spring element 5 is maintained by the magnetic retaining apparatus 32. In this state, the vehicle can now be appropriately parked, whereby the actuator naturally is also non-energized. Due to the projection 22, the preloading of the spring element 5 is nevertheless maintained, even without power.

LIST OF REFERENCE NUMERALS

1 drive shaft
2 drive
3 actuating element
4 rotating element
5 spring element
6 circular disk
7 first control cam
8 second control cam
11 worm
12 toothed-wheel array
13 toothed wheel
14 cable control
16 housing part
17 second actuating element
18 surface
19 surface
20 first engaging element
21 second engaging element
22 projection
25 housing plate
28 housing part
29 free end
31 housing part
32 electromagnetic retaining apparatus
50 electromagnet
51 stop face
52 magnet armature
53 magnetic-contact placement
54 holding frame
55 pivoting part
56 protuberances or projections
57 retaining pockets
58 planar surface of magnet armature
59 spherical or ball-shaped contact surfaces, projections
60 first position
61 second position
X first tilting or pivoting axis
Y second tilting or pivoting axis

The invention claimed is:

1. An actuator for a park lock of a motor vehicle automatic transmission, comprising:
a drive that powers a drive shaft,
a first actuating element that is operatively connected to the drive shaft and that serves to actuate a shifting mechanism,
a spring element that is supported on one side on a housing part of the actuator and, on the other side, on a second actuating element configured so as to load the spring element, and
an electromagnetic retaining apparatus with an electromagnet which magnetically interacts with a magnet armature containing a ferromagnetic material component for purposes of holding in place the spring element that is loaded under the build-up of a return force,
wherein the magnet armature is mounted so as to be tiltable and/or pivotable at a pivoting part of the retaining apparatus, wherein the pivoting part has a holding frame into which the magnet armature is inserted, and wherein the holding frame has a tapered wall thickness between the pivoting part and the holding frame so that the pivoting part may be pivoted or tilted around a first tilting or pivoting axis (X) at the pivoting part.

2. The actuator according to claim 1, wherein the holding frame has retaining pockets arranged diametrically to each other into which diametrically arranged protuberances of the magnet armature can be inserted, and wherein the protuberances rest on projections of the holding frame that project outwardly relative to the surface of the holding frame so that said protuberances can be tilted or pivoted around a second tilting or pivoting axis (Y).

3. The actuator according to claim 2, wherein the projections of the holding frame are configured so as to be at least partially spherical or ball-shaped so that the protuberances of the magnet armature rest in a way that they can be tilted and/or pivoted around the second tilting or pivoting axis (Y).

4. The actuator according to claim 2, wherein the protuberances comprise a bayonet catch and through a rotational movement relative to the retaining pockets, the magnet armature is secured in the holding frame with the bayonet catch.

5. A motor vehicle with an automatic transmission and with an actuator according to claim 2 that interacts therewith.

6. The actuator according to claim 1, wherein the magnet armature is tiltable or pivotable around two tilting or pivoting axes (X, Y) that are perpendicular to each other in a plane, so that, with magnetic-contact placement, the magnet armature comes to rest with its surface substantially planarly on a stop face of the electromagnet.

7. The actuator according to claim 1, wherein the pivoting part with the magnet armature can be moved back and forth between a first position formed by the magnetic-contact placement of the electromagnet and the magnet armature in order to hold the spring element, and a second position in which the spring element is not under load.

8. The actuator according to claim 1, wherein, with the magnetic-contact placement, a planar surface of the magnet armature is oriented substantially plane-parallel to a stop face of the holding magnet, or alternatively the planar surface of the magnet armature rests planarly on the stop face.

9. The actuator according to claim 1, wherein the pivoting part is mechanically operatively connected to the spring element via the second actuating element, so that, with the magnetic-contact placement on the holding magnet, the pivoting part keeps the spring element loaded under the build-up of a return force.

10. The actuator according to claim 1 wherein the magnet armature is substantially disk-shaped.

11. The actuator according to claim 1, wherein the holding frame and/or the pivoting part is/are made of plastic.

12. The actuator according to claim 1, further comprising a rotating element that can be driven and rotated by means of the drive shaft, wherein one side of the rotating element is configured with a first control cam that is operatively connected to the first actuating element in order to actuate the shifting mechanism, and an opposite side of the rotating element is configured with a second control cam in order to load the spring element.

13. The actuator according to claim 12, further comprising a first engaging element of the first actuating element to attach or engage the first control cam, and a second engaging element of the second actuating element to attach or engage the second control cam.

14. A motor vehicle with an automatic transmission and with an actuator according to claim 13 that interacts therewith.

15. The actuator according to claim 12, wherein the rotating element is a circular disk on which the two control cams are each arranged on opposite surfaces.

16. The actuator according to claim 12, wherein the first control cam is configured so that, when the rotating element is turned between its neutral angular position of 0° and its maximum positive angular position of up to +180°, the spring element is loaded under the build-up of a return force.

17. The actuator according to claim 1, further comprising a worm is arranged on the drive shaft by means of which a toothed wheel array then serves to drive the rotating element.

18. A motor vehicle with an automatic transmission and with an actuator according to claim 1 that interacts therewith.

* * * * *